US009298961B2

(12) United States Patent
Mazzone et al.

(10) Patent No.: US 9,298,961 B2
(45) Date of Patent: Mar. 29, 2016

(54) OPTICAL CODE READER

(71) Applicant: Datalogic IP Tech S.r.l., Lippo di Calderara di Reno (IT)

(72) Inventors: Claudio Mazzone, Crespellano (IT); Federico Canini, Zola Predosa (IT); Fabrizio Pareschi, Bologna (IT); Guido Maurizio Oliva, Rovigo (IT)

(73) Assignee: DATALOGIC IP TECH S.R.L., Calderara di Reno (Bologna) (IT)

( * ) Notice: Subject to any disclaimer, the term of this patent is extended or adjusted under 35 U.S.C. 154(b) by 8 days.

(21) Appl. No.: 14/369,409

(22) PCT Filed: Dec. 21, 2012

(86) PCT No.: PCT/IB2012/057636
§ 371 (c)(1),
(2) Date: Jun. 27, 2014

(87) PCT Pub. No.: WO2013/098752
PCT Pub. Date: Jul. 4, 2013

(65) Prior Publication Data
US 2014/0374482 A1    Dec. 25, 2014

(30) Foreign Application Priority Data

Dec. 30, 2011    (IT) .............................. MI2011A2454

(51) Int. Cl.
*G06K 7/10*    (2006.01)
(52) U.S. Cl.
CPC ............ *G06K 7/10732* (2013.01); *G06K 7/109* (2013.01); *G06K 7/10752* (2013.01); *G06K 2207/1011* (2013.01); *G06K 2207/1018* (2013.01)

(58) Field of Classification Search
USPC .................. 235/454, 455, 462.41, 462.06
See application file for complete search history.

(56) References Cited

U.S. PATENT DOCUMENTS

| 2003/0062413 A1 | 4/2003 | Gardiner et al. |
|---|---|---|
| 2006/0118629 A1 | 6/2006 | Shiramizu et al. |
| 2006/0219792 A1 | 10/2006 | Zhu et al. |
| 2008/0191026 A1 | 8/2008 | Patel et al. |
| 2009/0001175 A1 | 1/2009 | Goren et al. |

FOREIGN PATENT DOCUMENTS

| EP | 1437676 A1 | 7/2004 |
|---|---|---|
| EP | 1804089 B1 | 12/2011 |
| WO | WO2011/111079 A1 | 11/2012 |

OTHER PUBLICATIONS

International Search Report and Written Opinion dated May 3, 2013 from International Application No. PCT/IB2012/057636.

*Primary Examiner* — Daniel Hess
(74) *Attorney, Agent, or Firm* — Duane Morris LLP

(57) ABSTRACT

An apparatus for presentation reading of optical information with removable reader includes an optical information reader and a cradle or stand having a seat for seating the reader facing a predetermined optical information reading zone. The reader has an illuminator and the stand has an illuminator. A processor is configured to control a capture of an image of at least one portion of the reading zone, to analyze the image and, based on the analysis, to drive the switching on of either of the illuminator of the reader and/or the illuminator of the stand. The stand includes an optical component at the illuminator of the reader and/or at an aimer of the reader when seated in the seat, to define an aiming pattern and/or to modify the features of the illuminating beam of the reader.

35 Claims, 6 Drawing Sheets

OPTICAL CODE READER

BACKGROUND AND SUMMARY OF THE INVENTION

The present invention relates to an optical information reading apparatus, more specifically to an apparatus for presentation reading of optical information with removable reader.

In the present description and in the attached claims, the expression "optical information" is used in a broad sense to cover both one-dimensional, stacked and two-dimensional optical codes, wherein information is encoded in the shapes, size, colours and/or mutual positions of elements of at least two distinct colours, and alphanumeric characters, signatures, logos, stamps, trademarks, labels, hand-written text and images in general, and their combinations, in particular present on pre-printed forms, and images containing features suitable for identifying and/or selecting an object based on its shape and/or volume.

In the present description and in the attached claims, the term "light" is used in a broad sense, indicating electromagnetic radiation of a wavelength or a range of wavelengths not just in the visible field, rather also in the ultraviolet and infrared fields. In the same broad sense are terms such as "colour", "optical", "image" and "view" used. In particular, the encoded information can be applied onto a substrate in invisible, but sensitive to the ultraviolet or infrared inks.

Imaging reading apparatuses or readers of optical information (of the imager type) are well known. Such readers comprise a photodetector or sensor in the form of an array—linear or preferably matrix-type—of photosensitive elements, capable of generating an electric signal from an optical signal, and typically also image receiving optics, capable of forming an image of the substrate on the sensor—in other words of a three-dimensional or substantially flat object, such as a card or a document—containing the optical information, or a region thereof.

The evolution of the electric signal in space is indicative of the presence or absence, as well as of the relative size and possibly of the colour, of the elements constituting the optical information. Through such an electric signal, suitably processed, it is therefore possible to acquire for example an optical code and decode the information encoded therein.

Also imager readers are within the scope of the invention having the ability to capture photographs or videos and/or the ability to capture images of documents or regions of interest thereof for automatic character recognition or for document handling applications, wherein encoded information is present, also of different types, and not encoded information, in predetermined positions with respect to one another or with respect to the edges of a document or card.

Although readers of optical information of the imager type operating with just ambient light are known, they typically further comprise an illuminator suitable for projecting one or more light beams, possibly variable in intensity or spectral composition, towards the substrate carrying the optical information.

In the present description and in the attached claims, under "illuminator" it is meant to indicate a device having one or more light sources and possible optical components for forming the light beam(s); in the case of a plurality of sources, these can be arranged adjacent to each other or not and can be driven individually, in groups or all together.

An optical information reader of the portable or hand-held type (hand held reader) in general is gun shaped and comprises a reading head equipped with a light input and output window and a grippable handle, possibly equipped with a trigger activation button and with possible other control buttons. An operator holds the reader and "points" it towards an optical code or other optical information to be read, possibly through the help of a visible aiming pattern, starting the reading through a button ("manual" or "attended" reading or "trigger mode").

The reader houses, suitably located between the head and the handle, the illuminator, the emission and receiving optics, the sensor, as well as possibly one or more rechargeable batteries intended to power the same.

The reader can also house pre-processing electronics of the output signal of the sensor, acquisition and possibly decoding electronics of encoded optical information, recharging circuits of the optional batteries, one or more memories, as well as a communication interface for the transfer of the electric signal emitted by the sensor or of the acquired or decoded optical information, as well as for receiving remote setting and possibly activation controls.

The reader usually has a so-called cradle associated therewith that, besides acting as a support base to hold the reader when not in use, can be used for the collection of the data—raw or already processed—from the reader and their transferal to a remote processor and for the transmission of configuration parameters to the reader. The cradle is for this purpose provided with a communication interface compatible with that of the reader, as well as with a second communication interface with the remote processor. Each communication interface can be via cable, via facing electrical contacts or wireless, using waves, infrared, or optical. It should however be noted that the transferal of data and of the configuration parameters can also take place directly from the reader to the remote processor.

The cradle, powered by the electrical mains, can also act as a recharging base for the reader, through a connection via cable or through facing contacts. Possible transformers and recharging circuits can be housed in the cradle and/or in the reader and/or in a dedicated power supply.

If the cradle allows suitable positioning of the reader, keeping its light input/output window free and pointed towards a predetermined reading zone, the reader can also work without being held and directed by the operator, in a mode called "presentation reader" and the cradle is also called "stand". An operator or moving system proposes the substrate carrying the optical information in the reading zone, facing the reading window of the reader. In this way, a manual reader is converted into a "fixed" reader, which typically autonomously recognises the presence of the object and does not need a trigger by the operator.

If the reader is powered independently and directly interfaced with the remote processor, the cradle can still be used simply as a support for the "presentation reader" mode. Some readers are configured just to be held and directed by the operator, some just to operate as "presentation reader", while other can operate in both modes.

The invention in particular concerns this last type of apparatus for presentation reading or presentation reader with removable reader.

US 2008/0191026 A1, on which the preamble of claim 1 is based, discloses such an apparatus, comprising a reader and a stand having a seat for the reader. The reader has an illuminator and the stand has an illuminator. When the reader is housed in the stand, as detected by suitable means, the illuminator of the stand is used, in combination with that of the reader or—when it is more intense than the illuminator of the reader—also by itself, switching off the illuminator of the reader. In this way, a more intense illumination is provided with respect to the trigger mode wherein the reader is held, in order to allow a mode with shorter exposure time and therefore avoid blurred images and provide improved performance.

Starting from such a state of the art, the technical problem at the basis of the invention is to further improve the performance of an apparatus for presentation reading or presentation reader with removable reader in stand mode.

In a first aspect thereof the invention relates to an apparatus for presentation reading with removable reader, comprising an optical information reader and a cradle or stand having a seat for seating the reader facing a predetermined optical information reading zone,
wherein said reader has an illuminator and said stand has an illuminator,
characterised by comprising a processor configured to control a capture of an image of at least one portion of the reading zone, to analyse the image and, based on said analysis, to drive the switching on of either of said illuminator of the reader and/or said illuminator of the stand.

In the present description and in the attached claims, under the expression "drive to switch on" it is meant to also encompass maintaining the switched on state.

The Applicant has recognised that, by dynamically managing the division of the illumination intensity between stand and reader, it is possible to dynamically adapt the illumination of the reading zone to the gloss and/or reflectance characteristics, as determined by the surface finish and/or by the curvature etc. of the object or substrate carrying the optical information, and therefore on each occasion obtain the optimal illumination, also so as to compensate for possible illumination defects of either illuminator. In some cases, it may be advantageous to activate the two illuminators alternatively, in other cases in combination, for example when it is advantageous to illuminate an object from plural angles to reduce reflections.

Preferably, said analysis comprises assessing at least one feature selected from the group consisting of brightness, contrast, presence of a substrate, position of the substrate, presence of optical information of a predetermined type, presence of light spots ascribable to overexposure of a particularly bright or reflective part of the substrate, and presence of illumination unevenness ascribable to a particular slope or shape of the surface of the substrate.

Preferably, said processor also controls, based on such an image analysis, the exposure time of the sensor and/or other reading parameters, such as the gain of the sensor and the portion of the field of view to be captured, activating the acquisition just of a part of the photosensitive elements or pixels of the sensor.

Preferably, the apparatus is further configured for reading optical information of the captured and analysed image or, more preferably, of an image captured after said switch on control.

Preferably, said capturing is preliminary capturing of the image, possibly of a partial and/or subsampled region of the reading zone, to speed up the process and make it compatible with the quick operation typical of stand mode.

Preferably, said apparatus comprises means for detecting the presence of the reader in the stand, and said processor is configured to carry out said analysis and optional preliminary capturing when said means for detecting the presence of the reader in the stand indicate the presence thereof.

Said analysis and optional preliminary capturing can take place continuously (each frame or portion thereof), or periodically at each predetermined time interval, typically of a few milliseconds, or at each predetermined number of images, or at each capturing request for example by a presence sensor of a substrate in the reading zone etc., or also when the apparatus determines that it is needed because the image captured in the normal reading mode is of insufficient quality, as well as in combinations of such circumstances.

Alternatively or in addition, said stand comprises means for detecting the presence of a substrate in the reading zone, and said processor is configured to carry out said analysis and optional preliminary capturing when said means for detecting the presence of a substrate in the reading zone indicate the presence thereof.

Said means for detecting the presence of an object in the reading zone typically comprise a photocell or a battery of photocells, preferably with infrared LEDs so as to be able to be kept constantly switched on without disturbing either the possible operator or the reading of optical information, or an ultrasound detection device.

Preferably, said illuminator of the stand and/or said illuminator of the reader are adjustable intensity illuminators, and said processor is configured to adjust the illumination intensity of said illuminator of the stand and/or of said illuminator of the reader based on said analysis.

In this way it is possible for example to avoid the saturation of the sensor when the object or the substrate is too reflective. It is also possible to avoid the blinding of the sensor by direct reflection of a portion, however small, of the light emitted by the output window and possible components of the stand backwards, towards the sensor, through the receiving optics. Since the typical intensity of the light emitted is a few orders of magnitude greater than the intensity of the light coming from the reading zone and collected by the sensor, even a small increase in the light emitted by the illuminator of the reader, unless suitably screened, can cause spurious reflections on the receiving optics of an intensity such as to prevent reading.

Such adjustment of intensity can comprise the change of the driving current and/or the switching on of just a part of a plurality of light sources of the illuminator, and/or changing the time overlapping between the time interval in which the illumination is active and the time interval in which the integration of photons by the sensor takes place. In turn, such a change of the time overlapping can be adjusted by lengthening/shortening either or both of said time intervals and/or by staggering them by a variable entity.

Preferably, said processor is the main processor of said reader, intended for reading the optical information in the normal reading mode.

In an embodiment said stand comprises an optical component at said illuminator of the reader and/or at an aimer of the reader when housed in the seat, to define an aiming pattern and/or to modify the features of the illuminating beam of the reader, such as angular aperture and radiance profile.

Providing such an optical component represents an invention per se, even independently from providing the double illuminator described above. Such an element, of course, should not extend to the receiving zone, at which, optionally, it is possible to arrange an optically null element, or such as to modify the focal distance of the receiving optics without deteriorating the quality of the image.

Said optical component is advantageously a mask or a transmission hologram. A hologram has the substantial advantage of being able to provide a three-dimensional indication of the reading zone, not just of a base thereof on a plane.

In an embodiment, said optical component is a mask at the aimer of the reader when housed in the seat, defining a two-dimensional aiming pattern.

In an embodiment, said optical component is a mask at the illuminator of the reader when seated in the seat, defining a two-dimensional aiming pattern, with the proviso that the two-dimensional aiming pattern defined by the mask does not interfere with the illuminator function. This can for example be obtained with the fact that the mask defines just the edges (or part of them) of the reading zone or the edges of several regions of interest within the reading zone, or with the fact that the mask blocks just visible wavelengths not used for reading.

In an embodiment, said optical component is a transmission hologram at the aimer of the reader when seated in the seat, advantageously defining a three-dimensional aiming pattern.

In another embodiment, said optical component is a lens, in particular a non-imaging lens with locally defined profile like the one described in EP 1804089 A1, configured to change the radiance profile of the illuminating beam or its shape, or to modify the illuminated field, for example the aperture angle of the beam and/or its angle of incidence on the reading zone.

Said optical component could also be a system of lenses or prisms or even a diffractive optics.

In an embodiment, said stand comprises an aimer.

The use of an aimer on the stand, possibly in addition to an aimer of the reader, which can be used in combination or deactivated in stand mode, allows numerous advantages and represents an invention per se, also independently from providing the double illuminator described above.

First, it is possible to provide a specific aiming pattern most suitable for stand mode. Indeed, while in manual use it is preferable for the user to be given a mainly central indication of the framed field (the edges may not be on the framed object and therefore be lost), which can be done with simple optical components, for stand mode it is advantageous for the peripheral zone to be clearly highlighted, above all for "document handling" applications, which requires more complex and bulky optical components.

Also in the case in which the aiming pattern is the same in trigger mode and in stand mode, it is possible to provide such patterns with different proportions between height and width and/or with the same proportions, but different sizes, without having to use a variable focus aiming optics on the reader.

In cases in which it is foreseen for there to be variability of the conditions of use such as to justify its cost and complexity, it is possible to provide for the aiming/illumination system on the stand to be combined with a variable optical element, such as a mobile optics, or a liquid lens, or a deformable mirror, so as to be able to adapt shape and/or size of the aiming/illumination beam.

In a "document handling" application, the aimer and/or the illuminator of the stand is/are preferably configured to illuminate the predetermined regions of interest and/or the edges thereof, in this way aiding the alignment by the user.

In an embodiment, said aimer of the stand comprises a reflection hologram at the base of the reading zone and an illuminator of said reflection hologram, or a transmission hologram arranged in front of a suitable illuminator. In this way, it is advantageously possible to provide a three-dimensional aiming pattern.

Said aimer of the stand can be integrated in the illuminator of the stand, for example the illuminator of the stand can project an illumination pattern with a very clear visible edge.

Preferably, said stand comprises a loudspeaker and said apparatus comprises a sound indicator or a voice synthesizer configured to supply, through said loudspeaker, indications relating to read optical information and/or indications relating to the positioning of a substrate carrying optical information to be read with respect to the reading zone.

In this way, through the analysis by the processor of the reader of the preliminarily captured image or in the normal reading mode, the apparatus is able to guide the user in the positioning of the object/document, which could be useful also for visually-impaired users, for example in a fixed work station for checking documents.

The sound indicator or voice synthesizer can also indicate, in the case in which the electrical contact is not optimal for recharging, to correctly position the reader in the stand.

Advantageously, the illuminator of the stand comprises at least one light source selected from the group consisting of flash bulbs, laser diodes and LEDs, including high-power LEDs. By exploiting the substantial absence of space, weight and energy consumption constraints of the stand with respect to the reader, it is possible to provide an intense illumination, suitable for stand mode. Short exposure times are possible, avoiding blurred images, even when the speed of passage of the optical information in the reading zone is high and/or the direction of motion is highly variable.

Said illuminator of the stand can comprise light sources drivable according to at least two independent signals, so as to be able to switch on just one or just a few of them. For example, it is possible to provide for light sources forming illumination beams able to be selectively activated that are inclined differently, that are of different intensity, that are of different wavelength(s) (equal to or different from that or those emitted by the illuminator of the reader) etc., and activate such illumination beams for example with alternate flashes.

In this way it is possible to further optimise the performance of the reading apparatus each time using the most suitable illumination, at the discretion of the processor and based on the image analysis.

In an embodiment, said illuminator of the stand and/or said aimer of the stand comprises an array of substantially point sources able to be driven individually to provide an illumination pattern, an aiming pattern and/or an outcome indicating pattern.

Such an array is described for example in document WO 2011/111079 A1, incorporated herein by reference.

Alternatively or in addition, when the illuminator of the stand is orientable, it is also possible for the user to modify the direction of the light beam projected in the reading zone in the most suitable manner for the ambient light conditions, type and orientation of the surface of the object or document, and so on.

Preferably, the stand comprises an accumulation system that stores energy in the periods of low use, and makes it available in the maximum current demand periods, for example a battery but, more preferably, at least one capacitor of the Supercap or Ultracap type.

Preferably, the stand comprises an electrical mains power supply. Such a power supply, possibly in addition to a power supply through USB connection, is not affected by the limits of such USB power sources, which are on the other hand typically limited in current to 500 mA, and which are widely in use as power sources of optical information reading systems.

Advantageously, the stand further comprises an outcome indication device and/or a detector of the presence of an object or substrate in the reading zone and/or a distance or height detector. The latter can for example be a laser measurer of the time-of-flight or phase delay type, or a photocell or array of photocells, or an ultrasound or other type of sensor that is per se known; in this way the stand can generate a signal to drive a receiving autofocus on the reader, if present. Providing said devices in the stand advantageously makes it possible to keep the reader light and lower the consumption of the reader.

Advantageously, the stand has a controller for supplying the reader with a part of a power supply current in input to the stand, preferably in a dynamic manner according to the instantaneous consumption of the stand, so as to save the charge of or to charge a rechargeable battery power supply of the reader.

In a second aspect thereof, the invention relates to a method for optical information presentation reading with an apparatus provided with a removable reader and a cradle or stand, comprising the steps of detecting the presence of a reader in a seat of the stand, facing a predetermined reading zone, carrying out a capture of an image of at least one portion of the reading zone, analysing the image, and based on said analysis driving the switching on of either of an illuminator of the stand and/or an illuminator of the reader.

BRIEF DESCRIPTION OF THE DRAWINGS

Further features and advantages of the invention will become clearer from the description of some embodiments thereof, made with reference to the attached drawings, wherein similar parts and component are identified by similar numbers and wherein.

DETAILED DESCRIPTION

Figure 1:
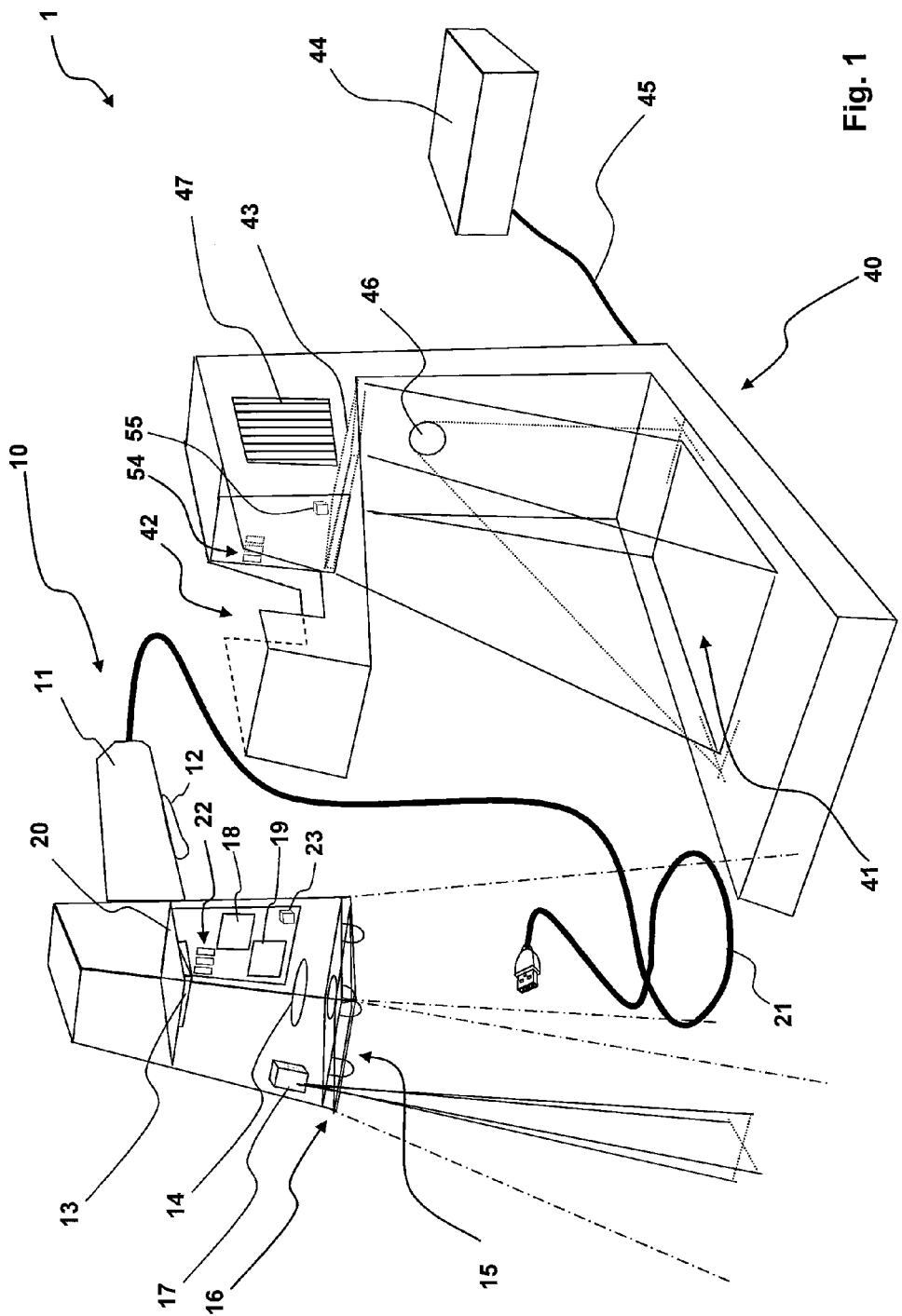
FIG. 1 illustrates an embodiment of an apparatus for presentation reading with a removable reader according to the invention, with the reader removed from the stand.
Figure 2:
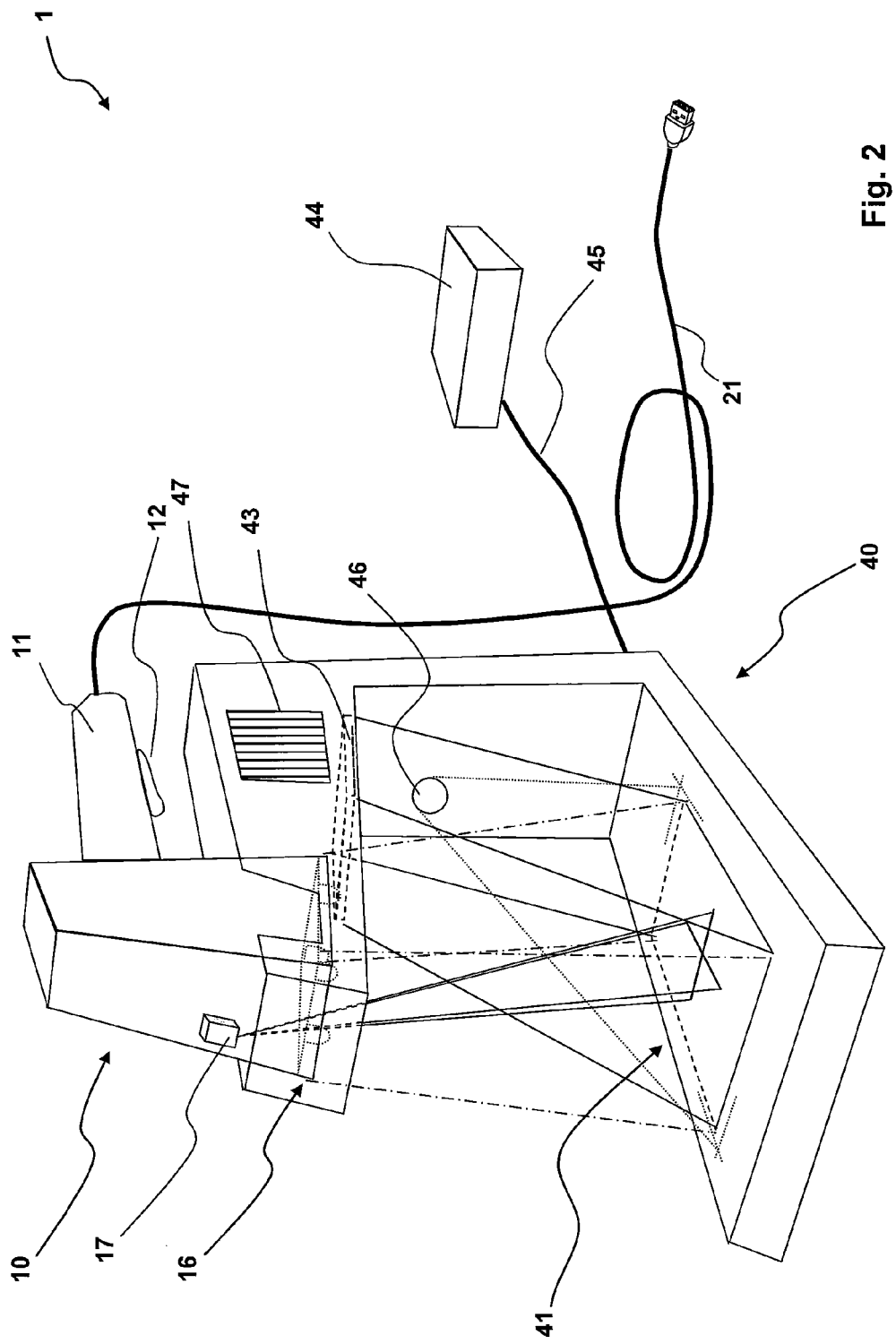
FIG. 2 schematically illustrates the apparatus of FIG. 1, with the reader seated in the stand and some components left out.

An embodiment of an apparatus 1 for presentation reading with removable reader according to the invention is shown schematically in FIGS. 1 and 2, wherein in FIG. 2 some components have been left out for the sake of clarity.

The apparatus 1 comprises a reader 10 and a stand 40 configured to house the reader 10 facing a predetermined reading zone 41.

In FIG. 1 the reader 10 is removed from the stand 40, while in FIG. 2 the reader 10 is seated in the stand 40.

The reader 10 shown is gun-shaped, having a handle or grip 11, provided with a trigger activation button 12 that however could also be absent, and with possible other control buttons (not shown).

The reader 10 comprises a sensor 13, two-dimensional in the case shown, but that could also be one-dimensional, coupled with a receiving optics 14, which could also be absent, facing a light input and output window 15.

The sensor 13 is configured to detect the light emitted, typically by reflection and/or diffusion, by a substrate arranged in front and within a certain range of distances from the window 15.

The reader 10 further comprises an illuminator 16, given as an example here as four LEDs at the window 15, around the receiving optic 14.

The reader 10 also optionally comprises an aimer 17, for example a laser aimer, possibly having an optics (not shown) to configure an aiming pattern to aid an operator to suitably arrange the substrate containing optical information with respect to the reader 10. Preferably, the aiming pattern generated by the aimer 17 identifies the centre of the reading zone in trigger mode, wherein the reader 10 is not seated in the stand 40, for example it is a cross as shown.

The reader 10 further comprises a processor 18 and optionally other electrical and/or electronic components, such as for example a memory 19. In the illustrated example, the above described electrical and electronic components are arranged on a bent circuit board 20, also housing the sensor 13.

The stand 40 comprises a seat 42 for seating the reader 10 facing the predetermined reading zone 41.

The seat 42 is such as not to hinder the input and output of light at the window 15 of the reader.

In the embodiment of FIGS. 1 and 2, the seat is formed just of a peripheral wall so as to be open at the window 15 of the reader. There could also be glass or transparent plastic.

The stand 40 further comprises an illuminator 43. The illuminator is configured to illuminate the reading zone 41.

The illuminator 43 of the stand 40 comprises at least one light source selected from the group consisting of flash bulbs, laser diodes and LEDs, including high-power LEDs.

In an embodiment, the illuminator 43 of the stand 40 comprises light sources drivable according to at least two independent signals, so as to be able to switch on just one or just a few of them. For example, it is possible to provide for light sources forming illumination beams able to be selectively activated that are inclined differently, that are of different intensity, that are of different wavelength(s) (equal to or different from that or those emitted by the illuminator of the reader) etc., and activate such illumination beams for example with alternate flashes.

The stand 40 further comprises an aimer 46, which could however be absent.

Preferably the illuminator 43 of the stand 40 and/or the aimer 46 of the stand 40 comprises an array of substantially point sources able to be driven individually to provide an illumination pattern, an aiming pattern and/or an outcome indicating pattern, as described for example in document WO 2011/111079 A1.

The aimer 46 of the stand 40 can be integrated in the illuminator 43 of the stand 40, for example the illuminator 43 of the stand 40 can project an illumination pattern with a very clear visible edge.

The stand 40 preferably comprises a power supply 44 from the electrical mains, shown only as an example in a separate casing, to which it is connected through a cable 45.

The stand 40 can have a controller to supply the reader 10 with a part of a power supply current in input to the stand 40 from the power supply 44, preferably in a dynamic manner according to the instantaneous consumption of the stand 40, so as to save the charge of or to charge a rechargeable battery power supply (not shown) of the reader 10.

The stand 40 can also comprise an accumulation system that stores energy in the periods of low use, and makes it available in maximum current demand periods, for example a battery but, more preferably, one or more capacitors of the Supercap or Ultracap type.

The stand 40 further comprises a loudspeaker 47, which could however be absent.

Alternatively or in addition to the aforementioned rechargeable battery power supply, the reader 10 is powered preferably through a cable 21 typically connected to a processor through a USB interface, but it could alternatively be connected to the main casing of the stand 40 or to the casing of the power supply 44, to be powered by the power supply 44 of the stand 40. In an even less preferable situation due to consumption, but in principle feasible, it is the reader that powers the stand.

The reader 10 and the stand 40 are also in communication for the transmission of control signals and possibly of data. As an example, FIGS. 1 and 2 show matching communication interfaces 22, 54 of the type with contacts in the reader 10 and in the stand 40. The contacts 22, 54 can also take the power supply and/or the recharging current from one to the other.

Alternatively or in addition, the communication of signals and/or data can take place via cable or wireless, optically, with infrared, or with radio waves.

The apparatus 1 comprises means for detecting the presence of the reader 1 in the stand 40.

As an example, FIGS. 1 and 2 show matching devices 23, 55 forming an electromechanical, opto-electronic or electromagnetic switch. Alternatively, the presence can be detected through the exchange of signals over the communication channel.

The stand 40 could also comprise means for detecting the presence of a substrate in the reading zone 41 (not shown), for example a photocell or a battery of photocells, preferably with infrared LEDs so as to be able to be kept constantly switched on without disturbing either the possible operator or the reading of optical information in other spectral zones, or an ultrasound detection device.

The stand 40 could also comprise a distance or height detector, for example a laser measurer of the time-of-flight, or phase delay type, or a photocell or array of photocells, or an ultrasound or other type of sensor of the per se known type; in this way the stand 40 can generate a signal to drive a system for moving the receiving optics 14 of the reader 10 thus making an autofocus system.

The shapes of the reader 10 and of the stand 40, as well as the type and arrangement of their components described above, can also be substantially different from the ones shown. In particular, it is not necessary for the reading zone 41 to rest on the casing of the stand: it could also rest on a work plane on which the apparatus 1 is arranged, or be projected in the space in front of the window 15. The window 15 does not necessarily have to face downwards as shown.

Figure 3:
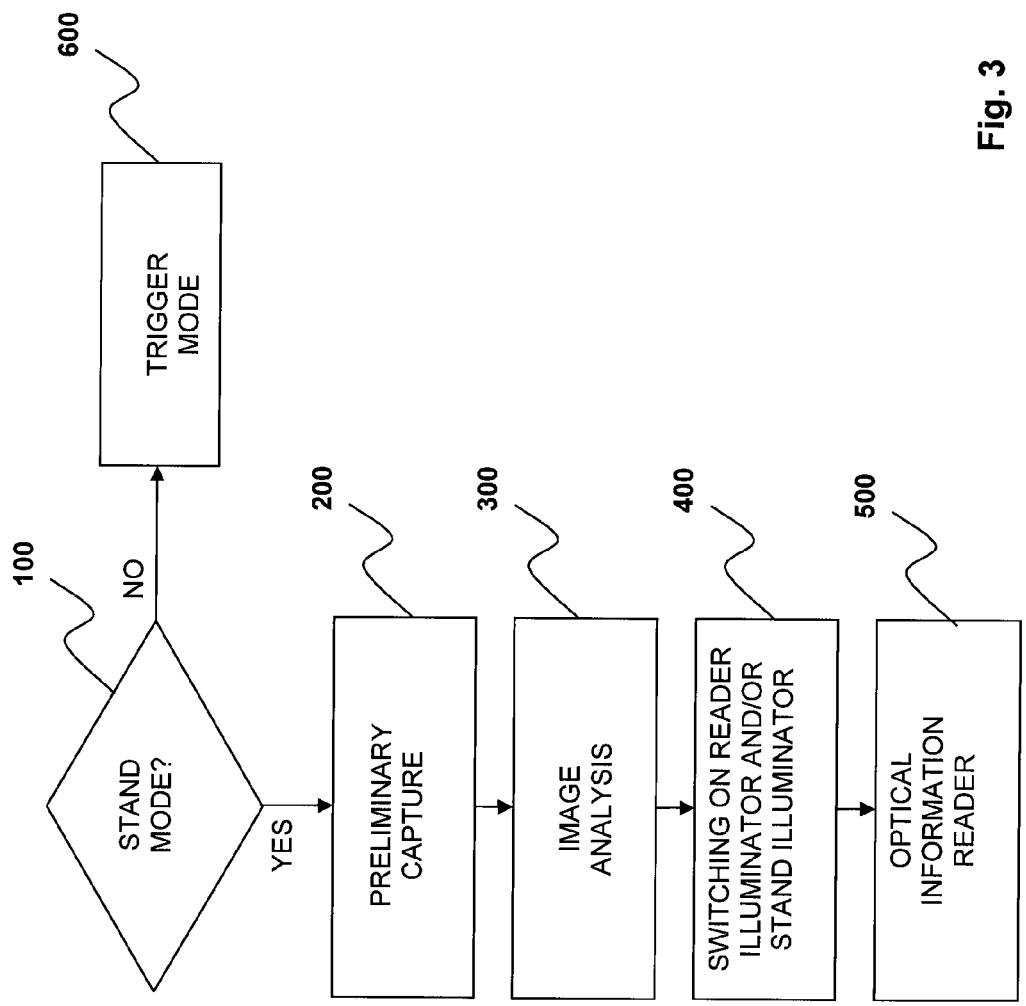
FIG. 3 is a block diagram of a method for reading with an apparatus for presentation reading with removable reader according to the invention.

FIG. 3 illustrates, in the form of a block diagram, the operation of the apparatus 1 and in particular the control of the illumination.

Such control is entrusted to the processor 18 of the reader, but alternatively it could be entrusted to a processor of the stand (not shown).

In a step 100, the processor 18 checks whether the apparatus 1 is in stand mode, in other words whether the reader 10 is seated in the stand 40, as detected by the suitable means, such as the matching devices 23, 55.

When the outcome of the check is positive, the processor 18 in a step 200 controls a preliminary capturing of an image of at least one portion of the reading zone 41 by the sensor 13. In such a preliminary capturing the illuminator 16 of the reader and/or the illuminator 43 of the stand is/are switched on, for example according to the configuration the apparatus 1 is in.

In the preliminary capturing, one or more regions of interest (ROI) are preferably output from the sensor 13 to the processor 18, in a very quick manner with respect to the reading of the entire frame. Alternatively or in addition, the processor 18 for the subsequent evaluation can acquire an image captured at lower resolution, i.e. considering for example just alternate photosensitive elements, of the entire sensor 13 or of one or more regions of interest.

Said preliminary capturing 200 can take place as stated above continuously (each frame or portion thereof), or periodically at each predetermined time interval, typically of a few milliseconds, or at each predetermined number of images, or at each capturing request for example by the sensor of presence of a substrate in the reading zone 41 etc., or even when the apparatus 1 determines the need for it because the image captured in normal reading mode is of unsuitable quality, as well as in combinations of such circumstances.

Thereafter, in a step 300 the processor 18 analyses the image preliminarily captured. In this step the features indicated in the introductory part of the present document are in particular evaluated: brightness, contrast, presence of a substrate in the reading zone 41, position of the substrate with respect to the reading zone 41, presence of optical information of a predetermined type, presence of light spots ascribable to overexposure of a particularly bright or reflective part of the substrate, and presence of illumination unevenness ascribable to a particular slope or shape of the surface of the substrate.

Therefore, in a step 400, the processor 18, based on said analysis, drives to switch on either of the illuminator 16 of the reader 10 and/or the illuminator 43 of the stand 40, including keeping the respective switched on/off state, where suitable.

When the illuminator 16 of the reader 10 and/or the illuminator 43 of the stand 40 are adjustable intensity illuminators, the processor 18 also adjusts their intensity of illumination based on said analysis.

As stated above, such adjustment of intensity can comprise the change of the driving current and/or the switching on of just a part of a plurality of light sources of the illuminator 16 of the reader 10 and/or of the illuminator 43 of the stand 40 and/or changing the time overlapping between the time interval in which the illumination is active and the time interval in which the integration of the photons by the sensor 13 takes place. In turn, such a change of the time overlapping can be adjusted by lengthening/shortening either or both of said time intervals and/or by staggering them by a variable entity.

The processor 18 can also control, based on such image analysis, the exposure time of the sensor 13 and/or other reading parameters, such as the gain of the sensor 13 and the portion of the field of view to be captured, by activating the acquisition of just a part of the photosensitive elements or pixels of the sensor 13.

In a subsequent step 500, the apparatus 1 operates by reading the optical information with the illumination decided in step 400, for example storing them and/or sending them to a remote processor, for example through the cable 21. In such a step at least one further acquisition of the reading zone 41, or of one or more regions of interest thereof can be carried out. In this step a possible pre-processing or processing of the acquired image is also carried out, in the preliminary capturing or in said further capturing, in a per se well known manner. In particular said further capturing will be carried out if the illumination decided in step 400 is enough different from the current one, used in step 200 and/or if the image preliminarily captured in step 200 has to low resolution or is too partial with respect to the reading zone 41.

Vice-versa, said at least one further capturing can act as preliminary capturing for a subsequent operative sequence, in other words the step 200 of preliminary capturing can be subsequently left out.

When, on the other hand, the outcome of the check 100 is negative, the processor 18 in a step 600 controls the trigger mode of the reader 10.

Before the capturing of step 200 and/or of step 500, either the aimer 17 of the reader 10 and/or the aimer 46 of the stand 40 where provided for can be switched on, so as to aid the operator in the arrangement of the substrate carrying the optical information to be read with respect to the reading zone 41. If by wavelength or by position the aiming pattern does not interfere with the acquisition of the optical information, the aimer can be kept switched on during the entire acquisition of the step 200 and/or 500.

Moreover, in step 200 and/or in step 500, the processor 18, possibly through a voice synthesizer, can through said loudspeaker 47 provide indications relating to the outcome of the reading of optical information and/or indications relating to the positioning of the substrate carrying the optical information to be read with respect to the reading zone 41.

The sound indicator or voice synthesizer can also indicate, in case the electrical contact between the contacts 22, 54 is not optimal for recharging, to correctly position the reader 10 in the stand 40.

The apparatus 1 could also comprise a device for providing such indications visually, for example a series of LEDs or an LCD display.

Figure 4:
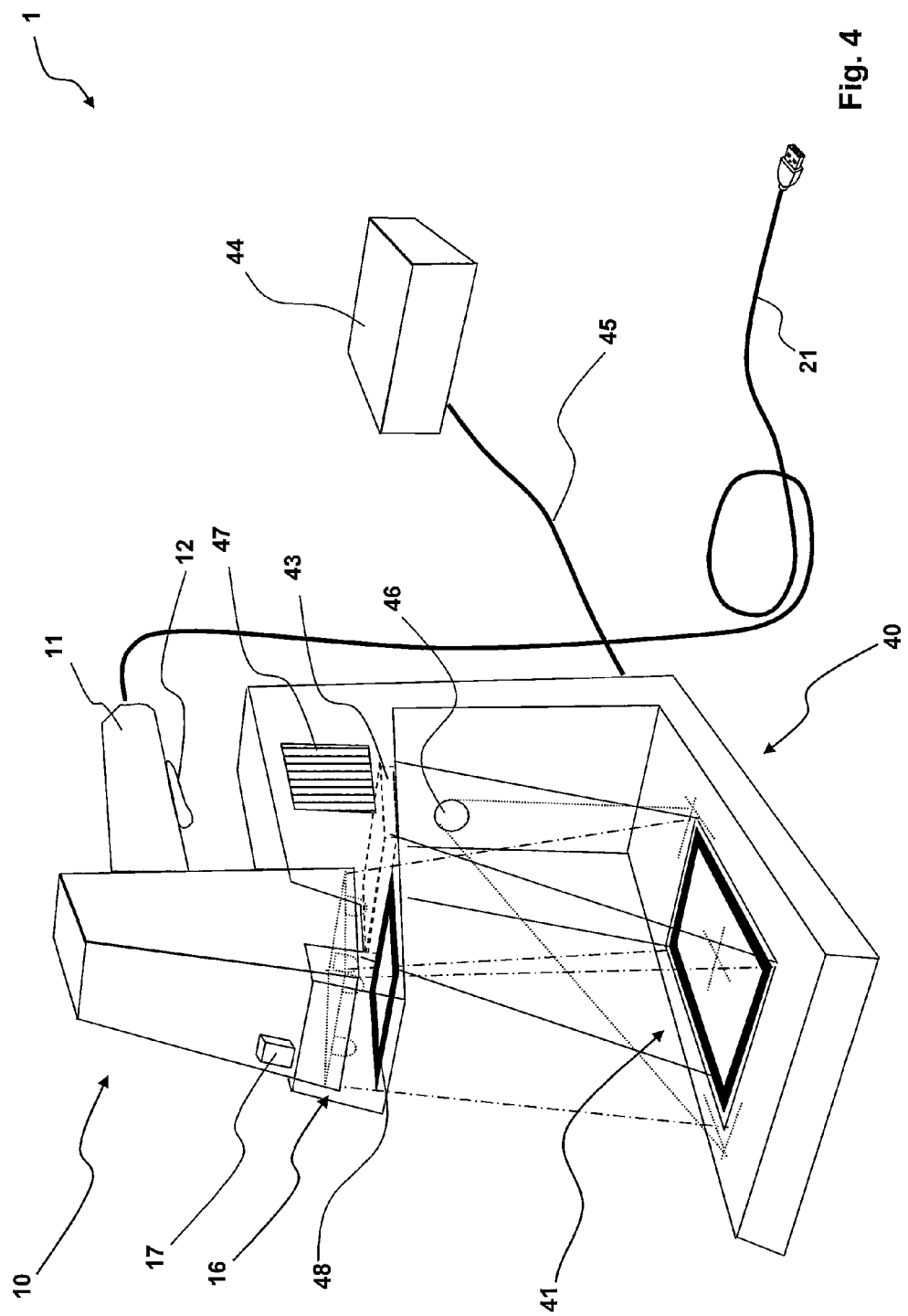
FIGS. 4 to 6 each schematically illustrate a different embodiment of an apparatus for presentation reading with removable reader according to the invention.
Figure 5:
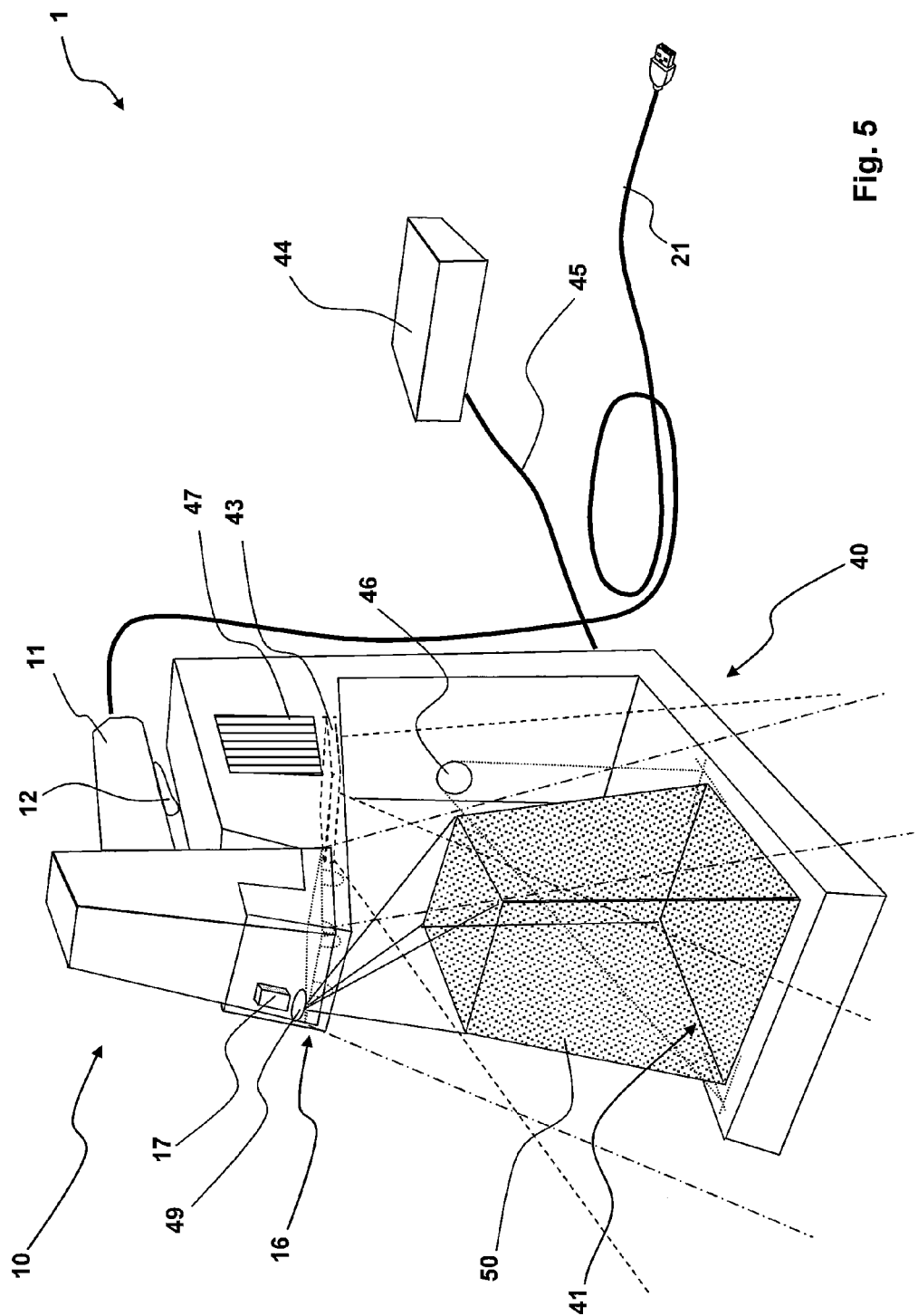
Figure 6:
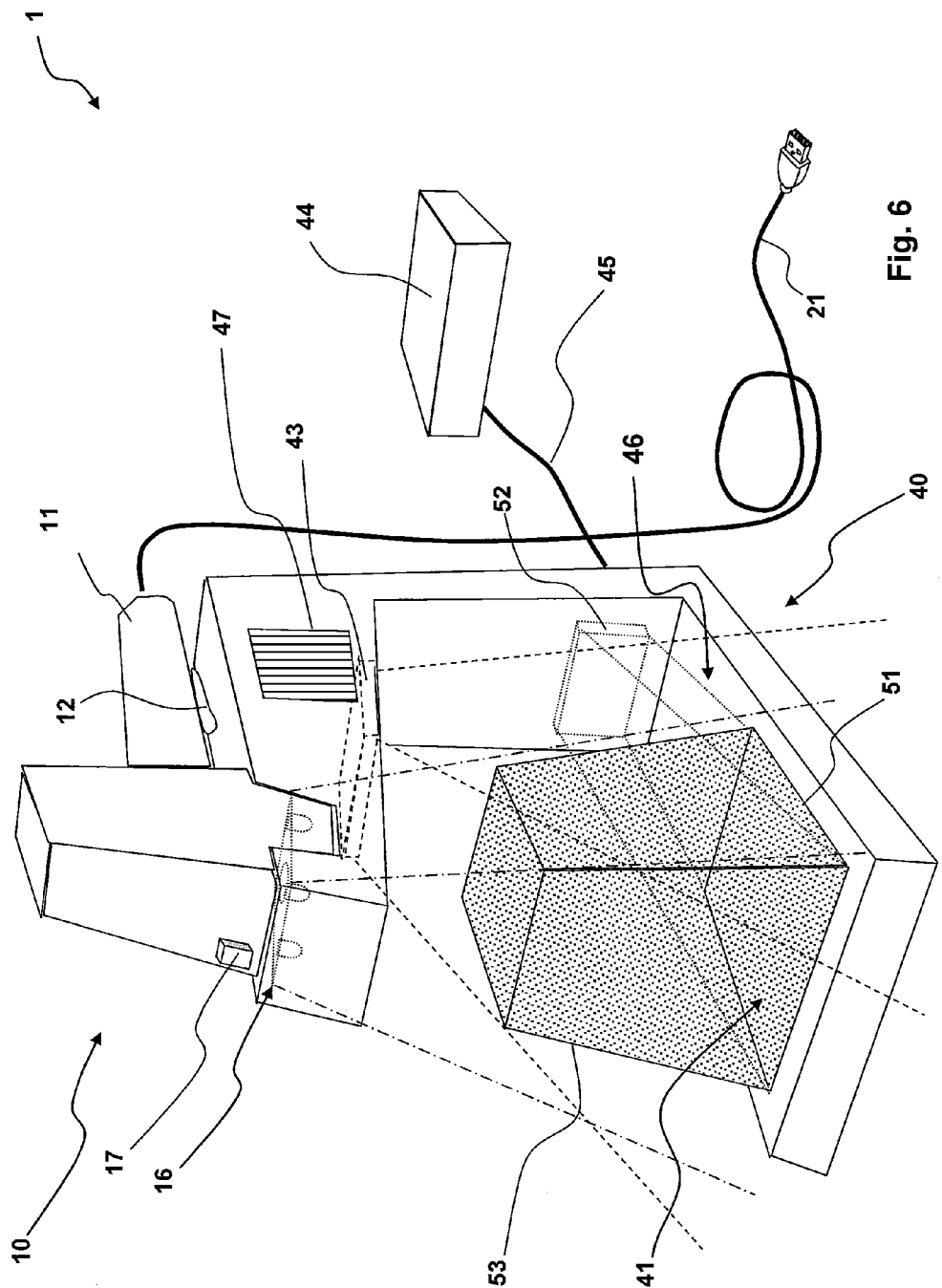

In FIGS. 4-6 the main components of other embodiments of an apparatus 1 for presentation reading with removable reader according to the invention are shown.

In FIG. 4, an aiming mask 48, which highlights the peripheral edge of the reading zone 41, is arranged in front of the illuminator 16 of the reader 10, in the stand 40. Alternatively, the mask could highlight just a part of the peripheral edge, for example two opposite or all four corners and/or intermediate portions of two opposite or of all four sides. Furthermore, for example in a "document handling" application just the edge—or part thereof—of one or more regions of interest could be highlighted in the reading zone 41.

As an alternative to the mask 48 it is possible to use a lens or a system of lenses or prisms, or even a diffractive optic, which modifies the features of the illuminating beam output from the window 15 of the reader 10, such as angular aperture and radiance profile. A non-imaging lens with locally defined profile like that described in EP 1804089 A1 can also be used, configured to change the radiance profile of the illuminating beam or its shape, or to modify the field illuminated, for example the aperture angle of the beam and/or its angle of incidence onto the reading zone 41.

Such an element of course should not extend to the zone covered by the sensing by the sensor 13, at which, optionally, an optically null element can be arranged, or such as to modify the focal distance of the receiving optics 14 without deteriorating the quality of the image.

In FIG. 5, in front of the aimer 17 of the reader 10 a transmission hologram 49, defining a three-dimensional aiming pattern 50, is arranged in the stand 40.

In FIG. 6, the aimer 46 of the stand 40 comprises a reflection hologram 51 at the base of the reading zone 41 and an illuminator 52 of said reflection hologram, defining a three-dimensional aiming pattern 53.

Alternatively or in addition to the transmission hologram 49 associated with the aimer 17 of the reader 10 and the reflection hologram 51 associated with the specific illuminator 52 of the stand 40, there could be a transmission hologram and a suitable illuminator on the stand 40.

Also in the absence of the hologram 51, an additional illuminator of the stand 40, projecting a coherent or incoherent beam, can be used to illuminate holograms arranged on credit cards or other safety codes.

In addition to the dynamic configuration of the illumination described above, the operative mode of the apparatus 1 can be configured based on the reading of an optical code, or via software from a processor connected to the reader 10 or to the stand 40, or through the preliminary analysis of an image during a setting or setup step of the apparatus 1. For example, in this way it is possible to establish which aimer 17 or 46 to use, which illuminator 16 or 43 to use, whether to use one or more wavelengths if present, one or more illuminators 43 of the stand if present, and so on.

What is claimed is:

1. An apparatus for presentation reading comprising:
   a removable reader, comprising an optical information reader; and
   a stand having a seat for seating the reader facing a predetermined optical information reading zone,
   wherein said reader has an illuminator and said stand has an illuminator,
   the apparatus further comprising a processor configured to control a capture of an image of at least one portion of the reading zone, to analyse the image and, based on said analysis, to drive the switching on of either of said illuminator of the reader and/or said illuminator of the stand,
   wherein said stand comprises an optical component at said illuminator of the reader and/or at an aimer of the reader when seated in the seat to define an aiming pattern and/or to modify the features of the illuminating beam of the reader.

2. The apparatus according to claim 1, wherein said optical component is a mask at the illuminator of the reader when seated in the seat, defining a two-dimensional aiming pattern.

3. The apparatus according to claim 1, wherein said optical component is a transmission hologram at the aimer of the reader when seated in the seat, defining a three-dimensional aiming pattern.

4. The apparatus according to claim 1, wherein said optical component is a lens configured to change the radiance profile or the shape of the illuminating beam, or for modifying the illuminated field.

5. The apparatus according to claim 1, wherein said stand comprises an aimer.

6. The apparatus according to claim 5, wherein the aimer of the stand and/or the illuminator of the stand is configured to illuminate predetermined regions of interest and/or edges thereof.

7. The apparatus according to claim 5, wherein said aimer of the stand comprises a reflection hologram at the base of the reading zone and an illuminator of said reflection hologram, or a transmission hologram arranged in front of a dedicated illuminator of the stand.

8. The apparatus according to claim 1, wherein said stand comprises a loudspeaker and said apparatus comprises a sound indicator or a voice synthesizer configured to provide, through said loudspeaker, indications relating to read optical information and/or indications relating to the positioning of a substrate carrying optical information to be read relative to the reading zone.

9. The apparatus according to claim 8, wherein said sound indicator or voice synthesizer signals to properly place the reader in the stand if the electrical contact is not optimal for the recharge.

10. The apparatus according to claim 1, wherein said stand comprises an accumulation system that stores energy during low usage periods and provides it during maximum current demand periods.

11. The apparatus according to claim 1, wherein said analysis comprises assessing at least one feature selected from the group consisting of: brightness, contrast, presence of a substrate in said reading zone, position of the substrate relative to said reading zone, presence of optical information of a predetermined type in said reading zone, presence of light spots ascribable to overexposure of a particularly bright or reflecting portion of a substrate arranged in said reading zone, and presence of illumination unevenness ascribable to a particular slope or shape of the surface of a substrate arranged in said reading zone.

12. The apparatus according to claim 1, wherein, based on such image analysis, said processor further controls at least one reading parameter selected from the group consisting of: the exposure time of a sensor, the gain of the sensor, and the portion of the field of view to be captured.

13. The apparatus according to claim 1, wherein said apparatus comprises means for detecting the presence of the reader in the stand, and said processor is configured to carry out said image analysis when said means for detecting the presence of the reader in the stand signal the presence thereof, under a circumstance selected from the group consisting of: continuously, periodically at each predetermined time interval, periodically at each predetermined number of images, at each capture request, when the apparatus determines the need thereof, and combinations thereof.

14. The apparatus according to claim 1, wherein said stand comprises means for detecting the presence of a substrate in the reading zone, and said processor is configured to carry out said image analysis when said means for detecting the presence of a substrate in the reading zone signal the presence thereof.

15. The apparatus according to claim 1, wherein said illuminator of the stand and/or said illuminator of the reader are adjustable intensity illuminators, and said processor is configured to adjust the illumination intensity of said illuminator of the stand and/or of said illuminator of the reader based on said analysis.

16. The apparatus according to claim 15, wherein said intensity adjustment comprises an adjustment selected from the group consisting of: changing the driving current, switching on only a portion of a plurality of light sources of said illuminator of the stand and/or of said illuminator of the reader, changing the time overlapping between a time interval wherein the illumination is active and a time interval wherein a photon integration takes place by a sensor, and combinations thereof, wherein such change of the time overlapping is adjusted by extending/shortening either of or both said time intervals, and/or by staggering them by a variable entity.

17. The apparatus according to claim 1, wherein said illuminator of the stand comprises light sources drivable according to at least two independent signals.

18. The apparatus according to claim 1, wherein said illuminator the stand can be oriented.

19. The apparatus according to claim 1, wherein said stand comprises a distance or height detector.

20. An apparatus for presentation reading comprising:
a removable reader, comprising an optical information reader; and
a stand having a seat for seating the reader facing a predetermined optical information reading zone,
wherein said reader has an illuminator and said stand has an illuminator,
the apparatus further comprising a processor configured to control a capture of an image of at least one portion of the reading zone, to analyse the image and, based on said analysis, to drive the switching on of either of said illuminator of the reader and/or said illuminator of the stand,
wherein said stand comprises an aimer.

21. The apparatus according to claim 20, wherein said analysis comprises assessing at least one feature selected from the group consisting of: brightness, contrast, presence of a substrate in said reading zone, position of the substrate relative to said reading zone, presence of optical information of a predetermined type in said reading zone, presence of light spots ascribable to overexposure of a particularly bright or reflecting portion of a substrate arranged in said reading zone, and presence of illumination unevenness ascribable to a particular slope or shape of the surface of a substrate arranged in said reading zone.

22. The apparatus according to claim 20, wherein, based on such image analysis, said processor further controls at least one reading parameter selected from the group consisting of: the exposure time of a sensor, the gain of the sensor, and the portion of the field of view to be captured.

23. The apparatus according to claim 20, wherein said apparatus comprises means for detecting the presence of the reader in the stand, and said processor is configured to carry out said image analysis when said means for detecting the presence of the reader in the stand signals the presence thereof, under a circumstance selected from the group consisting of: continuously, periodically at each predetermined time interval, periodically at each predetermined number of images, at each capture request, when the apparatus determines the need thereof, and combinations thereof.

24. The apparatus according to claim 20, wherein said stand comprises means for detecting the presence of a substrate in the reading zone, and said processor is configured to carry out said image analysis when said means for detecting the presence of a substrate in the reading zone signals the presence thereof.

25. The apparatus according to claim 20, wherein said illuminator of the stand and/or said illuminator of the reader are adjustable intensity illuminators, and said processor is configured to adjust the illumination intensity of said illuminator of the stand and/or of said illuminator of the reader based on said analysis.

26. The apparatus according to claim 25, wherein said intensity adjustment comprises an adjustment selected from the group consisting of: changing the driving current, switching on only a portion of a plurality of light sources of said illuminator of the stand and/or of said illuminator of the reader, changing the time overlapping between a time interval wherein the illumination is active and a time interval wherein the photon integration takes place by a sensor, and combinations thereof, wherein preferably such change of the time overlapping is adjusted by extending/shortening either of or both said time intervals, and/or by staggering them by a variable entity.

27. The apparatus according to claim 20, wherein the aimer of the stand and/or the illuminator of the stand is configured to illuminate predetermined regions of interest and/or edges thereof.

28. The apparatus according to claim 20, wherein said aimer of the stand comprises a reflection hologram at the base of the reading zone and an illuminator of said reflection hologram, or a transmission hologram arranged in front of a dedicated illuminator of the stand.

29. The apparatus according to claim 20, wherein said stand comprises a loudspeaker and said apparatus comprises a sound indicator or a voice synthesizer configured to provide, through said loudspeaker, indications relating to read optical information and/or indications relating to the positioning of a substrate carrying optical information to be read relative to the reading zone.

30. The apparatus according to claim 29, wherein said sound indicator or voice synthesizer signals to properly place the reader in the stand if the electrical contact is not optimal for the recharge.

31. The apparatus according to claim 20, wherein said illuminator of the stand comprises light sources drivable according to at least two independent signals.

32. The apparatus according to claim 20, wherein said illuminator of the stand can be orientated.

33. The apparatus according to claim 20, wherein said stand comprises an accumulation system that stores energy during low usage periods and provides it during maximum current demand periods.

34. The apparatus according to claim 20, wherein said stand comprises a distance or height detector.

35. An apparatus for presentation reading comprising:
- a removable reader, comprising an optical information reader; and
- a stand having a seat for seating the reader facing a predetermined optical information reading zone,
- wherein said reader has an illuminator and said stand has an illuminator,
- the apparatus further comprising a processor configured to control a capture of an image of at least one portion of the reading zone, to analyse the image and, based on said analysis, to drive the switching on of either of said illuminator of the reader and/or said illuminator of the stand,
- wherein said stand comprises a distance or height detector.

* * * * *